United States Patent [19]

Wagner, Jr. et al.

[11] Patent Number: 4,495,027
[45] Date of Patent: Jan. 22, 1985

[54] METHOD OF MAKING AN ORIENTED MULTILAYER HEAT SEALABLE PACKAGING FILM

[75] Inventors: John R. Wagner, Jr., Rochester; Carl C. Hein, Pittsford, both of N.Y.

[73] Assignee: Mobil Oil Corporation, New York, N.Y.

[21] Appl. No.: 576,972

[22] Filed: Feb. 3, 1984

Related U.S. Application Data

[62] Division of Ser. No. 355,427, Mar. 8, 1982, Pat. No. 4,447,494.

[51] Int. Cl.$^3$ .............................................. B29D 3/00
[52] U.S. Cl. ...................... 156/244.11; 156/244.24; 428/349; 428/414; 428/516; 428/518; 428/520; 428/522; 428/910
[58] Field of Search ............... 156/244.11, 244.14, 156/244.24; 428/411, 414, 520, 522, 910, 349, 516, 518

[56] References Cited

U.S. PATENT DOCUMENTS

| | | | |
|---|---|---|---|
| 4,214,039 | 7/1980 | Steiner et al. | 428/414 |
| 4,297,415 | 10/1981 | Ward et al. | 156/244.11 |
| 4,367,112 | 1/1983 | Park | 156/244.11 |
| 4,424,256 | 1/1984 | Christensen et al. | 156/244.11 |

*Primary Examiner*—Caleb Weston
*Attorney, Agent, or Firm*—Alexander J. McKillop; Michael G. Gilman; James P. O'Sullivan

[57] ABSTRACT

An oriented multilayer heat sealable film structure comprising a polyolefin film substrate, a layer of a random copolymer of ethylene and propylene, a primer layer on said copolymer layer and a layer of heat sealable vinylidene chloride polymer on said primer layer. The method of preparing said structure includes aging said structure at a temperature and for a time resulting in increased heat seal strength.

4 Claims, No Drawings

METHOD OF MAKING AN ORIENTED MULTILAYER HEAT SEALABLE PACKAGING FILM

This is a division of application Ser. No. 355,427, filed Mar. 8, 1982, now U.S. Pat. No. 4,447,494.

BACKGROUND OF THE INVENTION

This invention relates to a flexible multilayer heat sealable general packaging film and to a method of forming the same.

In the packaging of certain types of snack foods, for example, corn-based products and potato chips, it is common practice to employ a multilayer film having two or more polymeric layers wherein one of the layers is known to be an effective heat seal layer. In the packaging process a supply of such a multilayer film is shaped into a tube in a vertical form and fill machine. Marginal regions of the heat seal layer are brought in face to face relationship and sealed together. Thereafter the packaging machine automatically forms a hot seal and makes a horizontal severance across the bottom of bag; product is dispensed into the open end of the tube and thereafter a second horizontal heat seal is effected across the tube with a simultaneous severing through the tube to result in a product packaging in a tube heat sealed at both ends and along one seam at right angles to the end seals. While the snack food or other product is being dispensed into the package, air also is present in the package and this air assists in protecting and cushioning the product during subsequent shipment of the finished packages. During shipment of the product, particularly with larger sized bags, e.g., those containing 16 ounces of product, the bags have a tendency to split or burst at the end seals.

A multilayered wrapping film of the type having the above mentioned utility is described in U.S. Pat. No. 4,214,039, the subject matter of which is, in its entirety, incorporated by reference herein. This patent describes a packaging film structure comprising a polypropylene film substrate having a heat sealable vinylidene chloride polymer containing at least 50% by weight of vinylidene chloride. Intermediate the polypropylene film and the vinylidene chloride polymer is a primer coat which consists of the reaction product of an acidified aminoethylated vinyl polymer and an epoxy resin. This primer coat significantly enhances the bond strength between the polypropylene and the heat sealable vinylidene chloride polymer. While this packaging material is effective for the packaging of comparatively small quantities of product, there is a need to increase its seal strength when used for the packaging of comparatively large quantites of product.

SUMMARY OF THE INVENTION

In accordance with the present invention, an oriented multilayer heat sealable structure is provided which comprises:

(a) a substrate comprising a polyolefin film;

(b) a coextruded layer on a least one surface of (a), said layer consisting essentially of a random copolymer of ethylene and propylene, said copolymer containing from about 0.5 to about 6% by weight of ethylene, said substrate and coextruded layer being biaxially oriented;

(c) a primer coating on at least one of said layer (b); and (d) a heat sealable layer on said coating (c), said heat sealable layer comprising a vinylidene chloride copolymer containing at least 50% by weight of vinylidene chloride.

In a preferred form of the above-identified structure, the polyolefin film comprises homopolymer polypropylene interblended with from 0 to about 15 parts by weight of said copolymer.

The method for producing the heat sealable multiply film structure of the present invention comprises:

coextruding a substrate layer comprising a polyolefin film with a layer consisting essentially of a random copolymer of ethylene and propylene on at least one side of said polyolefin substrate; said copolymer containing from about 0.5 to about 6% by weight of ethylene and about 94 to about 99.5% by weight of propylene;

biaxially orienting the coextrudate;

applying a primer coating to the surface of at least one random copolymer layer;

applying a heat sealable layer on said primer coating, said heat sealable layer comprising a vinylidene chloride copolymer containing at least 50% by weight of vinylidene chloride; and aging the structure for a time and at a temperature sufficient to yield a heat seal strength between facing heat sealed layers greater than that obtained in the absence of said aging.

In a preferred method, the aging of the multilayer structure is for a period of time from about 24 hours to about 21 days at a temperature of from about 32° F. to about 150° F.

DESCRIPTION OF THE PREFERRED EMBODIMENTS

The polyolefins contemplated as the substrate or core material of the subject film structure include polyethylene, polypropylene, polybutene and copolymers and blends thereof. Particularly preferred is an isotactic polypropylene containing at least 80% by weight of isotactic polypropylene. It is preferred that the polypropylene have a melt flow index of from about 4 to 8 g/10 minutes.

The ethylene propylene random copolymer contemplated herein is conveniently formed by the simultaneous polymerization of the respective monomers. Effective formation of a random copolymer of ethylene and propylene is accomplished when the ethylene is present simultaneously with the propylene in an amount sufficient to result in from 0.5 to about 6% by weight of ethylene in the resulting copolymer. This system is characterized by random placement of the respective monomer units along the polymer chain. This is in contrast with a block copolymer of ethylene and propylene formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of soluble random copolymer.

In preparing the multiply structure of the present invention, the polypropylene and the ethylene propylene copolymer is coextruded so that the ethylene propylene copolymer layer is from about 2 to about 12% of the total thickness of the two layers. For some purposes, a layer of the copolymer can be on both surfaces of a core layer of polypropylene, in which case the two copolymer layers would amount to from 4 to 24% of the total thickness of the three layers In preparing the coextruded film it has been found advantageous and convenient to recycle certain quantities of scrap extrudate back into the base homopolymer polypropylene. Thus, the homopolymer polypropylene can have from 0 to 25% of reclaimed material interblended therein. This recycle material can contain from 0 to about 15% of the ethylene propylene copolymer therein.

It has been found that heat seal layers, such as vinylidene chloride copolymer heat seal layers, do not adhere well to polypropylene film surfaces even when the latter have been subjected to well known pretreatment operations such as, for example, treatment by corona discharge, flame, or oxidizing chemicals. The same has been found to be true in adhering the heat seal layers contemplated herein to the surface of the ethylene propylene copolymer. However, it has been found that the use of primers intermediate between the ethylene propylene copolymer and the heat seal layer provides an unexpectedly high level of adherence.

The primer materials contemplated for enhancing the bond between the ethylene propylene copolymer and the vinylidene chloride copolymer heat seal layer include the reaction product of an epoxy resin and an acidified aminoethylated vinyl polymer. The contemplated epoxy resins and glycidyl ethers of polyhydroxy compounds. Typical polyhydroxy compounds which may be used include bisphenol A, ring substituted bisphenol A, resorcinol, hydroquinone, phenol-formaldehyde novolac resins, aliphatic diols, such as ethylene glycol, propylene glycol, 1,4-butanediol, 1,6-hexanediol, glycerol, lower alkyl hydantoins and mixtures thereof.

The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from 170 to 280 may be used in the present invention, but the preferred range is 180 to 210.

A variation in the composition of the epoxy resin component is one in which a hydantoin compound is substituted for the bisphenol A. For example, 1,1-dimethyl hydantoin may be employed in a low molecular weight epoxy resin since resins based on this material are competely water soluble thereby eliminating the necessity for emulsification.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer compositions of the present invention is an amino modified acrylic polymer which is water soluble. This polymer is a curing agent for the epoxy compound. The preferred material is described in U.S. Pat. No. 3,719,629, the disclosure of which is incorporated herein by reference, and may be generically described as an acidified aminoethylated interpolymer having pendant aminoalkylate groups. This material is produced by polymerizing acrylate, methacrylate, styrene or other suitable monomers with sufficient methacrylic or acrylic acid to give a —COOH content of about 7.5 to about 12.5%. Solvent polymerization techniques are preferred. The polymer is then reacted with ethyleneimine monomer and acidified with hydrochloric acid to render the polymer water soluble.

The primer coating may be applied to the film substrate as a dispersion or as a solution, from an organic vehicle, for example, an alcohol or an aromatic hydrocarbon, such as xylene or a mixture thereof.

In one embodiment of the present invention, a liquid epoxy resin is emulsified in a solution of the curing agent by rapid stirring, the resultant dispersion is diluted with water to the desired concentration for coating, usually from about 2 to about 25% solids.

When mixing the epoxy resin with the curing agent, it is generally preferred to use a stoichiometric equivalent balance of epoxy and amine groups. However, it has been found that the stoichiometric ratio may be varied over a wide range, from about one epoxy group to about three amine groups through three epoxy groups to one amine group and preferably from about one epoxy group to two amine groups through about two epoxy groups to about one epoxy group, without seriously effecting the product's usefulness as a primer coating.

It is to be understood that the solution or dispersion of epoxy resin and curing agent can contain small amounts of wetting agents in order to facilitate the application of the primer material to the ethylene propylene copolymer surface. Conventional prior art nonionic wetting agents which can be employed include the hexyl or benzyl ether of ethylene glycol, the hexyl ether of diethylene glycol, butyl alcohol, hexyl alcohol, octyl alcohol, diacetone alcohol, and the like.

Although mixtures of the epoxy resin and the curing agents will cross-link or cure without the necessary addition of a catalyst, it has been found advantageous in certain instances to use an amine catalyst. Such catalysts include propylene diamine, hexamethylene diamine, etc.

It is to be understood that the present multiply structure is not limited to the specific class of primer compositions defined above. Other operable primer compositions include those defined in U.K. Pat. No. 1,134,876 which discloses a primer produced by condensing a monoaldehyde with an interpolymer of acrylamide or methacrylamide and at least one other unsaturated monomer. U.K. Pat. No. 1,174,328 discloses a material which has utility as a primer in the present invention which is the product resulting from condensing aminoaldehyde with acrylamide or methacrylamide and subsequently interpolymerizing the condensation product with at least one other unsaturated monomer in the presence of a $C_1-C_6$ alkanol.

A preferred primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. A particularly preferred primer resin is a 50% solids solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

The composition of the vinylidene chloride polymer latex which is employed as the heat sealable top coating material on the primer layer, is not critical to the practice of the invention. Commercially available vinylidene chloride latexes having a vinylidene chloride content of at least 50% and preferably from about 75% to about 92% may be employed. The other ethylenically unsaturated comonomers may include alpha, beta ethylenically unsaturated acids, such as acrylic and methacrylic acids; alkyl esters containing 1-18 carbon atoms of said acids, such as, methylmethacrylate, ethyl acrylate, butyl acrylate, etc. In addition alpha, beta ethylenically unsaturated nitriles such as acrylonitrile and methacrylonitrile can be employed. In addition monovinyl aromatic compounds such as styrene and vinyl chloride may be employed.

Specific vinylidene chloride polymer latexes contemplated comprise: 82% by weight vinylidene chloride, 14% by weight ethyl acrylate and 4% by weight acrylic acid. Alternatively, a polymer latex comprising about 80% by weight vinylidene chloride, about 17% by weight methyl acrylate and about 3% by weight methacrylic acid can likewise be employed. In addition, the heat seal composition described in U.S. Pat. No. 4,058,649, the disclosure of which is incorporated herein by reference in its entirety, can be employed.

The multiply structure of the present invention can have an overall thickness within a wide range, but is is preferably from about 0.5 up to about 1.75 mils in thickness. When the substrate is the homopolymer polypropylene it can have a film thickness of approximately one mil. In this instance the associated coextruded copolymer of ethylene and propylene can be present in a thickness of from about 0.02 to about 0.12 mils.

The primer dispersion, to be applied to the surface of the ethylene propylene copolymer, can have a solids concentration of from about 5% up to about 25%.

The primer dispersion can be applied to the surface of the ethylene propylene copolymer layer utilizing standard coating techniques so that a dry coating weight of from about 0.05 up to about 0.25 gram/1,000 square inches of film is obtained. The thus coated film can be subsequently passed through a hot air oven to completely remove water and solvent. Subsequently this primer coated film can be coated with the selected vinylidene chloride polymer latex also using standard coating techniques such as graveur, roll coating, and the like. The vinylidene chloride polymer coated system can be thereafter dried by passing it through a conventional hot air oven.

The amount of vinylidene chloride polymer applied to the substrate film may be varied over a wide range depending upon the specific properties desired in the final film product. Coating weights of from about 1 to about 6 grams per 1,000 square inches may be employed. If a 2-sided coated film is desired, the beneficial corona treating of the ethylene propylene copolymer coated substrate, the priming and the vinylidene chloride polymer application can be repeated, either in line or out-of-line.

In the following examples a base film of homopolymer polypropylene coated with a primer layer and a heat seal layer is compared with a base film of the same homopolymer polypropylene having the same primer layer and heat seal layer in association therewith. The overall thickness of the films tested is approximately one mil. The thickness of the ethylene propylene copolymer layer coextruded on to the homopolymer polypropylene layer is approximately 0.06 mils.

In the following examples the ESM heat seal test is a heat seal test designed to simulate conditions under which films might be sealed in a typical over-wrapping machine. For the test two strips of film are cut, three by fourteen inches, with the long direction being in the machine direction orientation of the film. The two strips of film are superimposed with coated surfaces, i.e., the polyvinylidene chloride polymer surfaces, in contact, and placed in a heat sealing machine with one movable heat sealing platen. On actuation, the heated platen lowers and contacts the film combination for a controlled period of time. The pressure used is that resulting from the force of a pressure cylinder set at about 5 psi and the time of contact is two seconds. A plurality of separate seals are simultaneously made on each strip of film. The film strips are cut one inch wide and the seal strengths are determined by placing the free ends of the film in the jaws of a Suter testing machine and pealing the seals apart at a rate of 20 inches per minute. The maximum force in grams is recorded as the heat seal strength.

Also, with respect to the following examples, a crimp seal test is carried out. It is designed to simulate conditions encountered in a device known in the industry as a "vertical form-and-fill" packaging machine. This type of machine, as indicated above, is designed to horizontally crimp seal across a tube of packaging material, dispense product into the tube, e.g., potato chips, and thereafter again horizontally crimp seal the opposite end of the tube to form a filled, sealed tubular package. Simultaneously with the seal the tube issevered. In the crimp seal test two heated platens with serrated surfaces are brought together by air pressure at 20 pounds per square inch on either side of the film strips for three-quarters of a second, then separated. Testing of the seals is carried out as above.

In the following examples, the base films, i.e. the homopolymer polypropylene of Example 1, the coextruded system of Example 2 and the polymer blend of Example 3, are all biaxially oriented by conventional means. In general, this includes forming the base film in sheet form and machine direction orienting (MDO) or stretching the same at the appropriate or optimum temperature, using transport rollers operating at different speeds. After the desired degree of MDO, the film is transverly direction oriented (TDO) for example, in a tentering apparatus, to impart an orientation or stretching which is at right angles to the MDO. The extent of orientation can be from about 3 to about 10 times its original dimension for the MDO and from about 3 to 10 times in the TDO.

For the base film of Example 2, the random ethylene propylene copolymer can be applied to the polypropylene after the polypropylene has been machine direction oriented. In this event, the copolymer will only be transversely oriented while the polypropylene is biaxially oriented. The techniques of U.S. Pat. No. 3,620,825 to Lohman and U.S. Pat. No. 3,671,383 to Sakata et al (the disclosures of which are incorporated herein in their entirety by reference) can be employed in this respect.

EXAMPLE 1

A biaxially oriented homopolymer isotactic polypropylene film of approximately one mil thickness was coated with the primer reaction product of the acidified aminoethylated vinyl polymer and epoxy resin of example 5 of aforementioned U.S. Pat. No. 4,214,039. The same general coating process of said example was employed in coating the polypropylene film. The dry coating weight of the primer material was equivalent to about 0.10 grams per 1,000 square inches of film. To the surface of the primer was applied a heat seal layer from an aqueous latex comprising a terpolymer resulting from the polymerization of about 82% by weight of vinylidene chloride, about 14% by weight of ethyl acrylate and about 4% by weight of acrylic acid. The aqueous latex also contained finely divided carnauba wax in the amount of 8 parts per 100 parts of the vinylidene chloride terpolymer In addition, finely divided talc was included in the latex in the amount of 0.5 parts per 100 parts of the vinylidene chloride terpolymer. The coating was dried to yield a coating weight of approximately 2.6 grams per 1,000 square inches of film.

EXAMPLE 2

Example 1 was repeated except that the primer composition and heat seal composition was deposited onto the ethylene propylene copolymer surface of a coextruded biaxially oriented composite film of the same polypropylene as in Example 1 and an ethylene propylene random copolymer. The ethylene propylene copolymer contained approximately 3.5% by weight of ethylene and a melt flow of about 7.

The combined thickness of the coextruded film was approximately one mil with the ethylene propylene copolymer amounting to approximately 6 percent of the total thickness.

ESM seals and crimp seals were formed in the multiply structures of Examples 1 and 2 and the comparative strength of these seals are shown in Table I.

EXAMPLE 3

For this example a base material was prepared by melt blending into homopolymer polypropylene approximately 6% by weight of the ethylene propylene random copolymer utilized in forming the coextruded base film of Example 2. Thus, the base film in this example, contained approximately 94% by weight of homopolymer polypropylene and 6% by weight of the ethylene propylene random copolymer. The primer of Example 1 was applied directly to the surface of this base film and the vinylidene chloride terpolymer of Example 1 was applied to the primer. ESM seals and crimp seals were formed in the manner described above by placing the terpolymer surfaces of strips of this structure in face-to-face relationship. Table I and Table II below compares the strength of these seals with the same type of seal in Example 1 and Example 2.

TABLE I

Crimp Seals 20 psi; ¾ Sec. Dwell (g/in.)

| | TEMPERATURE | |
|---|---|---|
| | 260° F. | 280° F. |
| Example 1 | 300 | 290 |
| Example 2 | 650 | 790 |
| Example 3 | 253 | 248 |

TABLE II

ESM Seals 5 psi; 2 Sec. Dwell (g/in.)

| | TEMPERATURE | | |
|---|---|---|---|
| | 230° F. | 250° F. | 270° F. |
| Example 1 | 295 | 310 | 355 |
| Example 2 | 440 | 515 | 560 |
| Example 3 | 270 | 260 | 275 |

As shown in Table I the strength of the seals at both 260° F. and 280° F. for Example 2 is significantly greater than twice that of Example 1. The seal strength of Example 3 at 260° F. and 280° F. is, for some reason, even inferior to the strength of the seal of Example 1. Likewise, in Table II it will be seen that the strength of the seal of Example 2, at all seal temperatures, is considerably greater than the seals of Example 1 and Example 3 at the corresponding temperatures.

It has been determined, during the development of the subject multiply film structure, that after the application of the primer layer and the heat seal layer, a certain aging period of time and temperature must be observed in order to obtain the outstandingly high heat seal bond that results from the present invention. If heat seals are effected shortly following the formation of the multiply film structure, a bond strength significantly lower than that obtained upon aging will result. Optimum aging can be accomplished over a period of time ranging from about 24 hours to about 21 days with the material held at a temperature ranging from about 32° F. to about 150° F. It should be understood that the higher aging temperatures will permit the length of time to be generally correspondingly shorter.

Although the present invention has been described with preferred embodiments, it is to be understood that modifications and variations may be resorted to without departing from the spirit and scope of this invention. Such variations and modifications are considered to be within the purview and scope of the appended claims.

What is claimed is:

1. The method for producing a heat sealable multiply film structure comprising:
    coextruding a substrate layer comprising homopolymer polypropylene with a layer consisting essentially of a random copolymer of ethylene and propylene on at least one side of said polypropylene layer, said copolymer containing from about 0.5 to about 6% by weight of ethylene and about 94 to about 99.5% by weight of propylene;
    biaxially orienting the coextrudate;
    applying a primer coating to the surface of at least one random copolymer layer;
    applying a heat sealable layer on said primer coating, said heat sealable layer comprising a vinylidene chloride copolymer containing at least 50% by weight of vinylidene chloride; and
    aging the structure for a time and at a temperature sufficient to yield a heat seal strength between facing heat sealed layers greater than that obtained in the absence of said aging.

2. The method of claim 1 wherein said aging is for a period of time of from about 24 hours to about 21 days at a temperature of about 32° F. to about 150° F.

3. The method for producing a heat sealable multiply film structure comprising:
    machine direction orienting a substrate layer comprising homopolymer polypropylene;

applying to at least one side of said polypropylene layer a layer consisting essentially of a random copolymer of ethylene and propylene containing from about 0.5 to about 6% by weight of ethylene and about 94 to about 99.5% by weight of propylene;

transverse direction orienting the polypropylene layer having the applied copolymer layer;

applying a primer coating to the surface of at least one random copolymer layer;

applying a heat sealable layer on said primer coating; said heat sealable layer comprising a vinylidene chloride copolymer containing at least 50% by weight of chloride; and aging the structure for a time and at a temperature sufficient to yield a heat seal strength between facing heat sealed layers greater than that obtained in the absence of said aging.

4. The method of claim 3 wherein said aging is for a period of time of from about 24 hours to about 21 days at a temperature of about 32° F. to about 150° F.

* * * * *